Dec. 4, 1923.
B. F. SEYMOUR
1,476,187
RESILIENT WHEEL
Filed Feb. 28, 1920   2 Sheets-Sheet 1
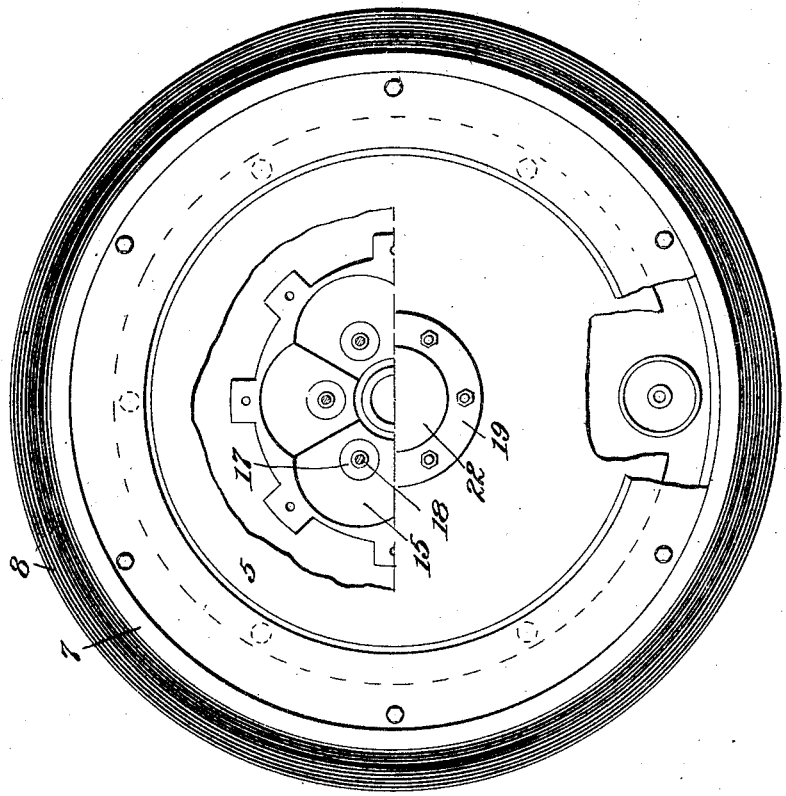
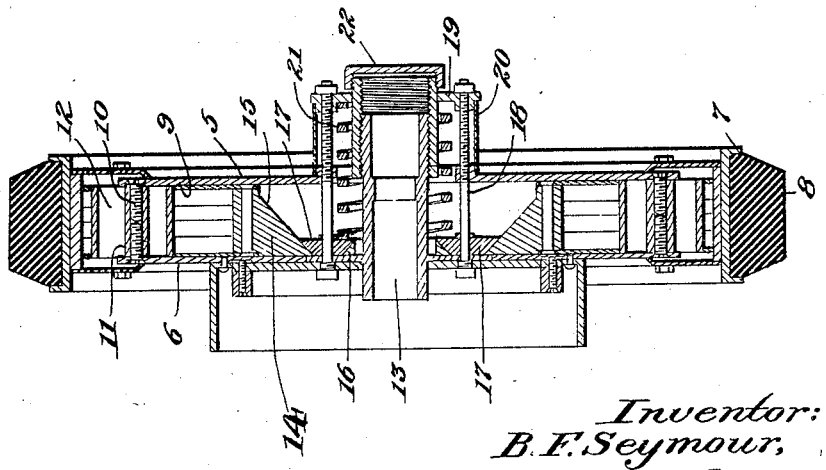
Inventor:
B. F. Seymour,
Atty.

Dec. 4, 1923.                                                                1,476,187
                         B. F. SEYMOUR
                         RESILIENT WHEEL
                      Filed Feb. 28, 1920          2 Sheets-Sheet 2
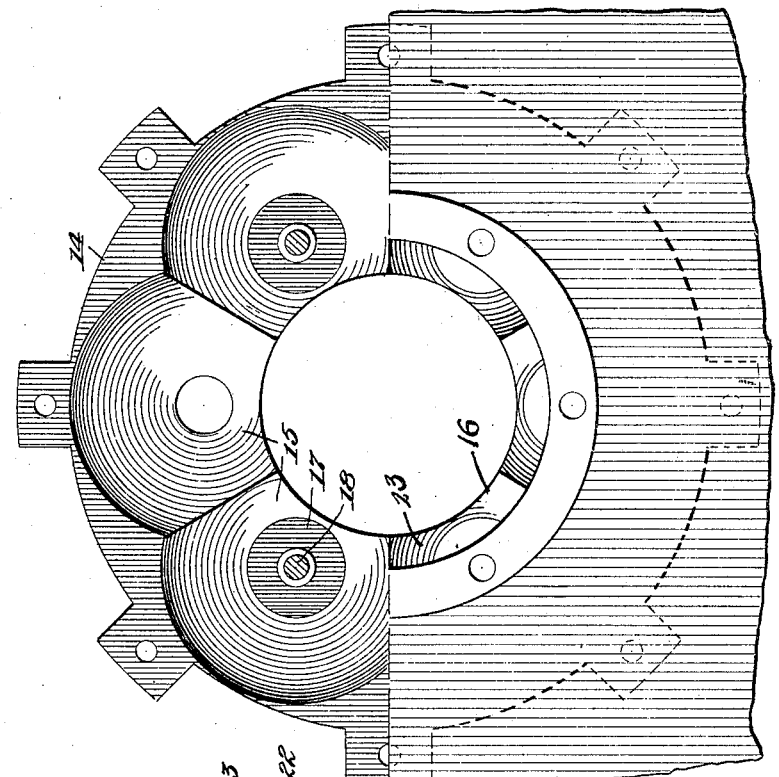
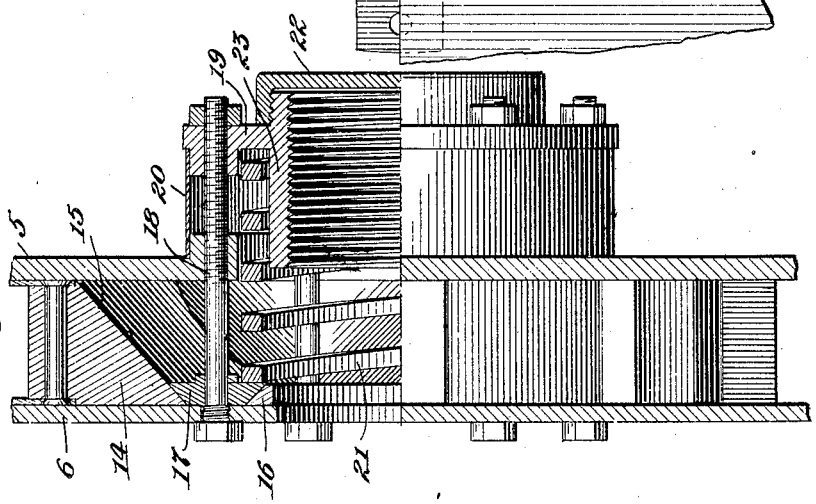
Inventor:
B. F. Seymour,
by W. H. H. Byrne
Att'y.

Patented Dec. 4, 1923.

1,476,187

UNITED STATES PATENT OFFICE.

BENJAMIN F. SEYMOUR, OF WASHINGTON, DISTRICT OF COLUMBIA.

RESILIENT WHEEL.

Application filed February 28, 1920. Serial No. 361,993.

*To all whom it may concern:*

Be it known that I, BENJAMIN F. SEYMOUR, a citizen of the United States, residing at Washington, in the District of Columbia, have invented certain new and useful Improvements in Resilient Wheels; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial No. 310,970, filed July 15, 1919; Serial No. 322,627, filed Sept. 9, 1919; Serial No. 330,374, filed Oct. 13, 1919; Serial No. 336,632, filed Nov. 8, 1919; Serial No. 342,283, filed Dec. 3, 1919; Serial No. 342,284, filed Dec. 3, 1919; Serial No. 342,285, filed Dec. 3, 1919, and Serial No. 342,286, filed Dec. 3, 1919.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

The invention is shown by way of illustration in the accompanying drawings wherein, Figure 1 is a central sectional view showing the application of the device to a vehicle wheel, Figure 2, a side elevational view thereof, with parts broken away, Figure 3, an enlarged detail view, partly in section of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members, 5 and 6, which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figure 1. It will be understod, of course, that said spaces 12 are provided to allow the wheel rim to have limited radial movement with respect to the hub portion 13 of the wheel.

The resilient transmission and bearing device per se comprises the wheel rim portion 14 having a plurality of conical shaped recesses 15 located adjacent the hub, and a ring member 16 (Figs. 3 and 4), mounted on the hub, having recesses 23 complemental with the recesses 15, and therewith cooperable to receive the several cone members 17. Said cone members 17 are mounted respectively on the annular series of bolts 18, and are adapted to have limited sliding movement on said bolts due to radial movements of the wheel rim.

The several bolts 18 are mounted on the hub side plates 5 and 6 and an end plate 19, which, with the annular plate portion 20, provides a housing member, making an effective closure for retaining the lubricant and excluding foreign matter, as will be understood. A single spring 21 of the proper strength and resiliency is centrally mounted on the inner hub portion 23 and seats against the several conical heads 17 and holds the same seated under the proper degree of tension and affords the necessary cushioning element against which the said cone heads work under the limited radial movement of the rim relative to the hub in the normal running of the wheel.

It will therefore be seen from the foregoing that any shock or jarring imparted to the wheel rim will be greatly dissipated or absorbed in transmittal to the hub, and consequently to the vehicle body, through the coacting cones and the resilient element.

The invention is not to be understood as being limited to the details of construction herein shown and described, as these may be varied widely without departing from the spirit of the invention.

Having thus described my said invention, what I claim as new and desire to protect by United States Letters Patent is:

1. In a combined resilient transmission and bearing for vehicle wheels, the combination of a hub portion, a wheel rim mounted to have limited radial movement therein, a plurality of independent cone members mounted to have axial movement on the hub portion, complemental cone elements on the rim and hub together cooperable with said hub cone members, and a common tensioning means holding the independent hub members in engagement with said complemental rim and hub cone elements, substantially as set forth.

2. In a combined resilient transmission and bearing for vehicle wheels, the combination of a hub portion, a wheel rim mounted to have limited radial movement therein, a plurality of laterally disposed bolts mounted on the hub, a plurality of cone members axially movable on said bolts, said rim having a plurality of segmental cone recessed portions formed therein, a ring mounted on the hub having recessed portions complementary to said rim segmental cone portions, said recessed portions receiving said cone members, and a tensioning means holding said cone members seated in said recesses, substantially as set forth.

3. In a combined resilient transmission and bearing for vehicle wheels, the combination of a hub portion having side plates, a plurality of bolts securing said side plates, a wheel rim mounted to have limited radial movement between the side plates, said rim having an inner flange portion disposed adjacent one of the said plates and provided with an annular series of conical recessed portions, a ring mounted on the hub having recessed portions complementary to said rim recessed portion, a plurality of independent cone members mounted to have axial movement on said bolts and co-operable with said conical recesses, and a tensioning spring holding the cone members seated in said recesses, substantially as set forth.

4. In a combined resilient transmission and bearing for vehicle wheels, the combination of a hub portion having side plates and an internal annular flange portion, a plurality of bolts securing said side plates, a wheel rim mounted to have limited radial movement between the side plates, said rim having an annular series of recessed portions, a ring mounted on the hub having recessed portions complementary to said rim recessed portions, a plurality of cone members mounted to have axial movement on said bolts and co-operable with said conical recesses in the wheel rim and ring, and a spring fitted on said annular flange portion of the hub holding said cone members seated in said recesses, substantially as set forth.

In testimony whereof I affix my signature.

BENJAMIN F. SEYMOUR.